Patented Aug. 11, 1953

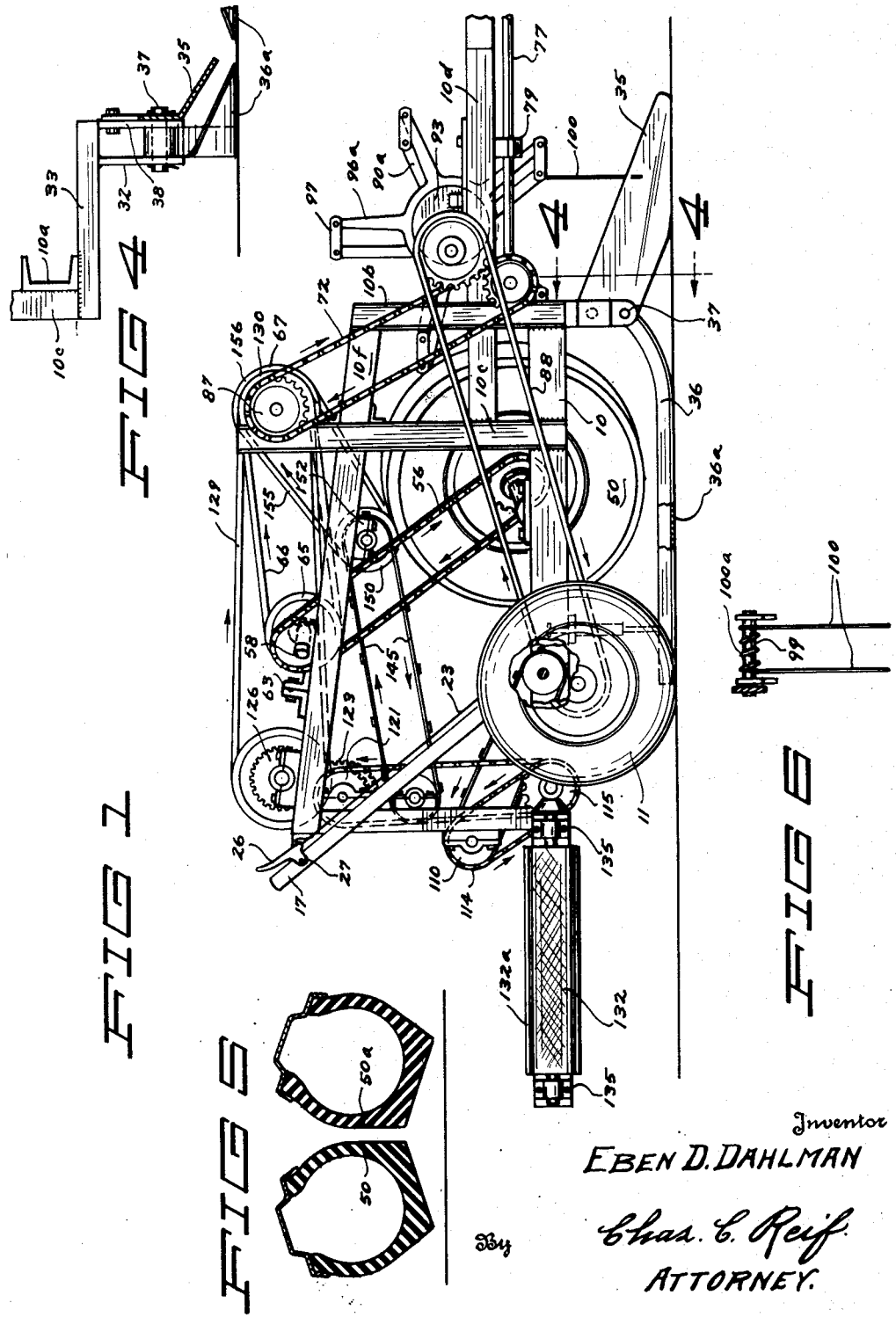

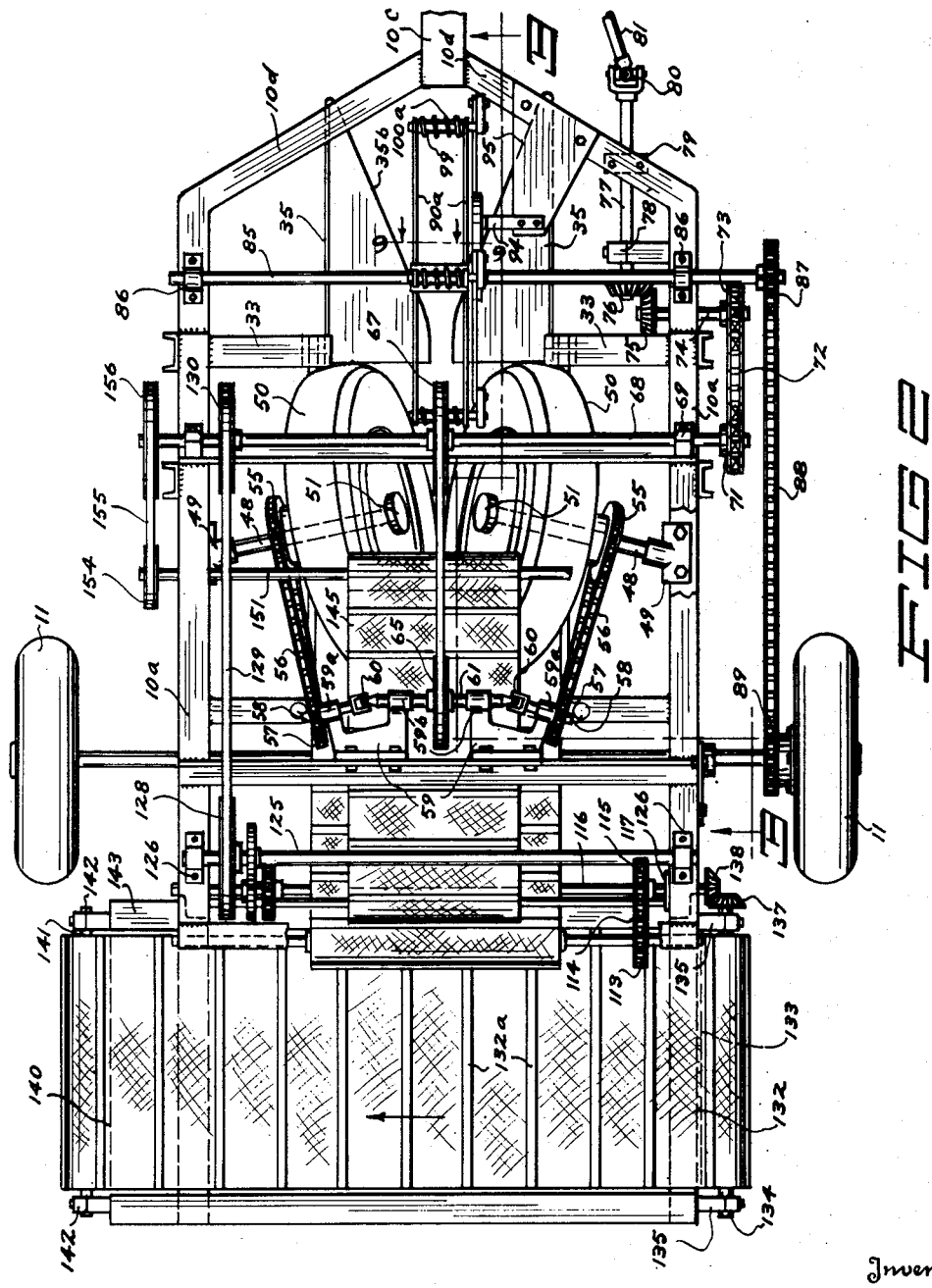

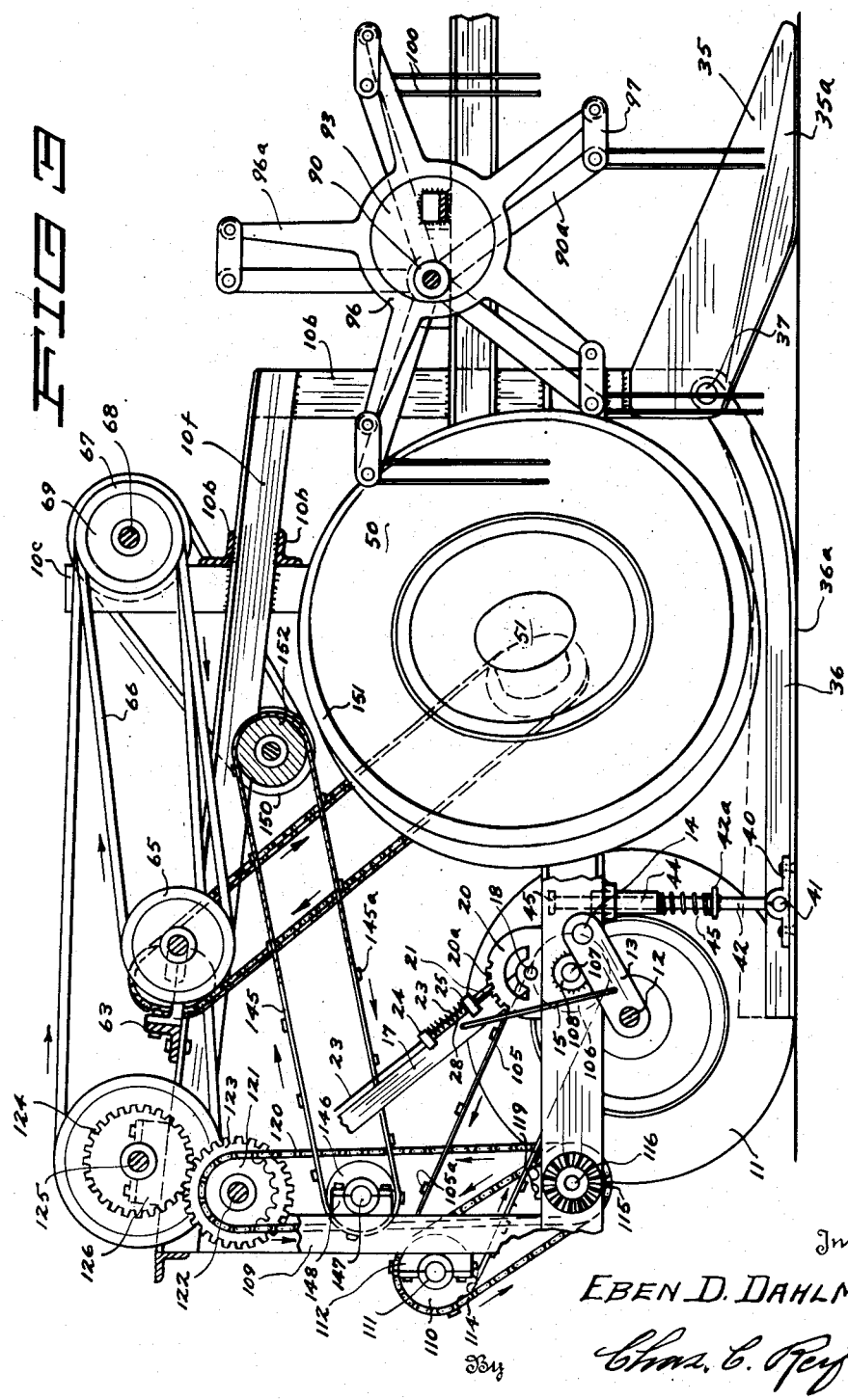

2,648,185

UNITED STATES PATENT OFFICE 2,648,185

VINE-HANDLING MACHINE

Eben D. Dahlman, Grandy, Minn.

Application March 25, 1950, Serial No. 151,930

7 Claims. (Cl. 55—66)

This invention relates to a machine for handling vines of plants, such as potato vines. It is now a common practice where potatoes are raised in quantity to have harvesting machines for lifting or digging the potatoes and delivering the same into suitable receptacles. In places where there is a very luxuriant growth of the vines, such as the Red River Valley in Minnesota and the Dakotas, considerable trouble is encountered with the vines in the harvesting operation. It is desirable therefore to get the vines out of the way before the potatoes are dug.

It is an object of this invention to provide a comparatively simple and very efficient machine for removing and handling the vines.

It is a further object of this invention to provide a machine comprising a frame supported to move over the ground having a pair of wheels disposed in planes which converge downwardly and which also preferably converge rearwardly, said wheels having portions below their axes which are in close proximity and between which the vines are gripped and pulled rearwardly.

It is another object of the invention to provide a machine comprising a frame movable over the ground, means at the front of the frame for guiding the vines toward the center of the frame, a pair of rotated wheels in the rear of said means, said wheels being disposed in planes which converge downwardly and also which preferably converge rearwardly, said wheels having portions below their axes which move in close proximity to each other and transversely spaced members below said wheels having lower surfaces engaging the ground and between which the vines are pulled upwardly by said wheels.

It is still further an object of the invention to provide such a machine as set forth in the preceding paragraph, together with a rotated reel disposed over said means for moving the vines toward said wheels, and suitable conveyors for receiving and handling the vines delivered by said wheels.

These and other objects and advantages of the invention will be fully set forth in the following description made in connection with the accompanying drawings in which like reference characters refer to similar parts throughout the several views and in which:

Fig. 1 is a view in side elevation of the machine;

Fig. 2 is a plan view of the machine with parts removed;

Fig. 3 is a view in side elevation of the front portion of the machine as shown on an enlarged scale and taken on line 3—3 of Fig. 2;

Fig. 4 is a partial vertical section taken on line 4—4 of Fig. 1, as indicated by the arrows;

Fig. 5 is a transverse vertical section through the lower and adjacent portions of the vine-gripping wheels; and Fig. 6 is a vertical section taken substantially on line 6—6 of Fig. 2, as indicated by the arrows.

Referring to the drawings, a machine is shown comprising a frame 10. While this frame could be variously constructed, in the embodiment of the invention illustrated it is shown as comprising transversely spaced longitudinally extending side members 10a which may be in the form of channels having their flanges extending outwardly. Each member 10a has secured thereto at its forward end and extending vertically therefrom a member 10b. Each member 10a also has secured thereto adjacent members 10b a vertically extending member 10c. Horizontally extending members 10d are connected respectively to members 10b and 10c and extending forwardly from member 10b the same converging and being connected to a central member 10e. Portion 10e will be provided at its front end with a suitable hitch, not shown, by means of which it can be connected to a tractor. Frame 10 is supported adjacent its rear end by wheels 11 mounted upon an axle 12 which is supported in arms 13 at each side of the frame and which are swingably mounted at their other ends about pivot members or bolts 14. Arms 13 can be swung about members 14 and for this purpose one of the arms 13 is connected by a link 15 to a lever 17. Lever 17 is mounted for swinging movement at its lower end about a pivot 18 and extends upwardly and rearwardly from said pivot. A toothed sector plate 20 is secured to frame 10 adjacent lever 17 and a tooth or detent 21 is provided adapted to enter one of the spaced notches 20a of plate 20, member 21 being secured to a rod 23 guided in a bearing 24 secured to lever 17 and being connected at its upper end to the lower end of a hand grip lever 26 pivotally connected at 27 to the lever 17. A compression coiled spring 28 surrounds rod 23 bearing at its upper end against bearing 24 and at its lower end against a collar 30 secured to rod 23. Tooth 21 and rod 23 are thus urged downwardly by spring 28 but can be retracted so as to permit swinging of lever 17 by gripping the lever 26. When arms 13 are swung it will be seen that frame 10 will be raised or lowered.

Transversely spaced members 32 depend from bars 33 which are secured to the bottom of members 10a and extend inwardly therefrom at each side of the frame 10. Secured to members 32 are the transversely spaced members 35 extending forwardly from bars 33 and having portions 35a adapted to move adjacent or in contact with the ground and having forwardly diverging edges or portions 35b. At the rear of members 35 there is a comparatively small space between portions 35b. A pair of members 36 is provided the same having lower surfaces 36a adapted to move in contact with the ground and there is a comparatively small space between the adjacent sides of members 36, which members are disposed at each side of a longitudinal line extending centrally between members 35. Members 36 at their forward ends are swingably mounted about pivots 37 supported in members 32 and which may be held in position by cotter pins 38. At their rear ends members 36 have secured thereto small brackets 40 in which are carried pins 41. A rod 42 has a hub into which pin 41 extends so that there is a pivotal connection between rod 42 and member 36. Rod 42 extends upwardly through a guide member 44 which is secured to the side frame member 10a. A compression coiled spring 45 surrounds rod 42 bearing at its upper end against member 44 and at its lower end against a collar 42a on rod 42. Rod 42 and thus each member 36 is urged downwardly by spring 45 so that it is yieldingly and resiliently held against the ground. A collar 46 is secured to the upper end of each rod 42 to prevent the same moving out of member 44. It will be understood that there is one of the rods 42 for each member 36.

Bearing rods 48 are provided and these are rigidly secured at their outer ends to frame members 10a. While this could be variously done, in the embodiment of the invention illustrated they are shown secured in the hubs of brackets 49 which are welded to side frame members 10a. Rotatably mounted on members 48 respectively are wheels 50. Wheels 50 will be provided with suitable bearings as used for automobile wheels and will be held on members 48 by suitable nuts or caps 51. The wheels 50 are very much like automobile wheels having pneumatic tires thereon. The planes in which wheels 50 are respectively disposed converge downwardly and also preferably converge rearwardly, as shown in Fig. 2. Wheels 50 have side portions 50a, preferably adjacent their peripheries, which at their closest portions are substantially parallel. Portions 50a are disposed below the axes of wheels 50 and the sides of the wheels diverge forwardly from the points of closest proximity and the sides will at the rear portions of the wheels diverge somewhat upwardly. Wheels 50 are positively driven and for this purpose each one has secured thereto a sprocket 55 over which runs a chain 56 also running over a sprocket 57. Sprockets 57 are respectively carried on shafts 58 rotatable in bearings 59a and respectively connected by universal joints 60 to a shaft 61 journaled in bearings 59b. Bearings 59a and 59b are carried by and are portions of brackets 59 secured to a transverse bar 63 supported at its ends on longitudinally extending bars 10f which are in turn supported at their forward ends by members 10b. Bars 10f are supported at their rear ends by vertically extending bars 10g secured at their lower ends to side members 10a. It will be noted that the planes of sprockets 55 and 57 are parallel to the planes of wheels 50. Shaft 61 has secured thereto a pulley 65 over which runs a belt 66 also running over a pulley 67 which is secured to a transversely extending shaft 68 journaled in bearings 69 secured to the vertically extending members 10c which are secured by the angle brackets 10h to members 10f. Bearings 69 are shown as capped bearings. Shaft 68 has secured to one end thereof a sprocket 71 over which runs a chain 72 also running over a sprocket 73 secured to a shaft 74 journaled in a bearing secured to one side frame 10a and having secured thereto at its other end a beveled gear 75. Beveled gear 75 meshes with a beveled gear 76 secured to a shaft 77 journaled in a bearing 78 secured to one side frame member 10a and also journaled in a bearing 79 secured to the lower side of one member 10d. Shaft 77 is connected by a universal joint 80 to a shaft 81 which will extend to the power takeoff of the tractor used to pull the machine.

A shaft 85 extends transversely of the machine and is journaled in bearings 86 secured to members 10d the same having secured to one end a sprocket 87. A chain 88 runs over sprocket 87 and over a sprocket 89 secured to one of the wheels 11. Shaft 85 has secured thereto the hub of a member or spider 90 having pairs of radially extending arms 90a. Arms 90a of each pair are transversely spaced. An eccentric 93 is supported by a bar 94 secured to one end of a plate bracket 95 secured to one of the members 10d. Another member or spider 96 has a hub surrounding eccentric 93 from which extend radial arms 96a. The outer ends of arms 90a and 96a are respectively pivotally connected in pairs by links 97, as shown in Fig. 3. The pivot 98 connecting link 97 to the arms 90a in each of said pairs extends between arms 90a and has thereon a sleeve 99. A spring rod 100 has convolutions 100a extending about member 99 and has ends projecting substantially radially from member 99. Member 100 will be connected to member 99, which member 99 will also be held from rotation. With the described structure members 90 and 96 will rotate together and due to the eccentric 93 the links 97 will be held substantially in the position shown in Fig. 3 during such rotation. The members or rods 100 can flex resiliently about their ends connected to member 99 and will move with members 90 and 96, thus forming a reel. Said reel is driven as illustrated from the wheels 11, as set forth above.

The vines are guided toward the center of the machine by the members 35 and pass to the wheels 50, being aided in this movement by the members 100 of the reel. The vines are gripped and pulled rearwardly and upwardly by members 50 and pass to the rear of said members. An endless conveyor 105 is provided disposed in the rear of wheels 50, the same running over a drum 106 secured to a shaft 107 extending transversely of the machine and being mounted in bearings 108 secured to the side frame members 10a. Conveyor 105 at its rear end also runs over a drum 110 secured to a shaft 111 extending transversely of the machine and journaled in capped bearings 112 secured to the members 10g. A shaft 111 has secured thereto a sprocket 113 over which runs a chain 114 also running over a sprocket 115 secured to a shaft 116. Shaft 116 extends transversely of the machine and is journaled in bearings 117 secured to the side frame members 10a. Shaft 116 has a sprocket 119 secured thereto adjacent its end remote from sprocket 115 and a chain 120 runs over sprocket 119 and over another sprocket 121 secured to a shaft 122 journaled in suitable bearings secured to members 10g. Shaft 122 also carries a gear 123 meshing with a gear 124 secured to a shaft 125 which extends transversely of the machine and is mounted in bearings 126 secured to capped members 10f. Shaft 125 has also secured thereto a pulley 128 over which runs a belt 129 also running over a pulley 130 secured to shaft 68. The conveyor 105 is thus driven from shaft 68 through pulley 130, belt 129, pulley 128, gears 123 and 124, chain 120, shaft 116 and chain 114. Another conveyor 132 is provided which is an endless conveyor and extends transversely of the machine substantially horizontally at the rear thereof. Conveyor 132 runs over a drum 133 secured to a shaft 134 journaled in bearings 135 secured to one side frame member 10a. Shaft 134 has secured at one end thereof a beveled gear 137 which meshes with another beveled gear 138 secured to shaft 116. At its other end conveyor 132 runs over a drum 140 secured to a shaft 141 journaled in bearings 142 secured to bars 143 projecting from and secured to one side frame member 10a. Conveyors 105 and 132 will be formed of some strong flexible sheet material, such as heavy canvas, and will preferably be provided respectively with transverse slats 105a and 132a. The vines will be discharged from conveyor 105 on a conveyor 132 and will be conveyed to one side of the machine by the latter. Another endless member 145 is provided, the same running over a drum 146 at one end secured to a shaft 147 journaled in capped bearings 148 secured to members 10g. At its other end member 145 runs over a drum 150 secured to a shaft 151 journaled in capped bearings 152 secured to the under sides of members 10f. Member or belt 145 is also preferably provided with spaced transverse slats 145a. Shaft 151 has secured thereto a pulley 154 over which runs a belt 155 also running over a pulley 156 secured to shaft 68.

In operation the machine will be pulled along the ground supported on wheels 11 and the machine will align centrally with a row of potatoes so that the row is longitudinally aligned with the space between members 35. As these members move along very close to or in contact with the ground, they will lift the sides of the potato vines and will guide the vines toward the center of the machine so that they pass through the comparatively small space at the rear ends of members 35. The vines will then pass rearwardly between the members 36. As the machine moves forward the reel comprising members 100 will be rotated so that members 100 move rearwardly at the lower side thereof and said members will act to move the top portions of the vines rearwardly. As the vines are thus moved rearwardly they will be gripped by the converging sides of the wheels 50 and will be pulled rearwardly and upwardly as said wheels rotate toward the rear of the machine at their lower sides. When the vines are pulled upwardly the stocks will be between the members 36 and will be pulled upwardly through quite a narrow space so that no potatoes will be lifted with the vines. Should any potatoes adhere to the vines as they are lifted they will be prevented from passing upwardly by the plate-like bottom portions of members 36. The vines after passing the wheels 50 will be delivered to the top of conveyor 105 which will move them rearwardly. The endless member 145 is provided to engage the tops of the vines and move them downwardly onto conveyor 105. It will be noted that the lower run of member 145 moves rearwardly and approaches quite closely to the top of conveyor 105. A good hold will therefore be held on the vines to move them rearwardly onto conveyor 132. Conveyor 132 will preferably be moved in the direction indicated by the arrow in Fig. 2. The vines are thus discharged at one side of the machine in a windrow and can be conveniently handled therefrom.

From the above description it will be seen that I have provided a comparatively simple and very efficient machine for lifting or removing potato or other vines from the ground and delivering them nicely in a windrow. The machine can be moved quite rapidly along the row of potatoes and the vines quickly removed. The device has been amply demonstrated in actual practice, found to be very successful and efficient and its commercial production is under way.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A machine for gathering and removing potato vines without lifting the potatoes having in combination, a wheel supported frame adapted to be moved along the ground, a pair of vine-engaging members spaced substantially equal distances from the longitudinal center line of said frame, supported from said frame, extending forwardly and downwardly and adapted to engage the ground at their forward portions, said members having rearwardly converging edges which are spaced a small distance apart at the rear ends thereof, a second pair of vine moving members spaced substantially equal distances from said center line and movable in contact with the ground in the rear of said first mentioned members respectively, a pair of rotatable wheels above said last mentioned members spaced substantially equal distances from said center line and having their central planes diverging upwardly, said wheels having side surfaces adjacent their peripheries which are in close proximity at the lower portions thereof, means for positively rotating said wheels whereby the potato vines are engaged, lifted and moved toward said center line by said first mentioned members and are then engaged by said second pair of members and moved farther toward said center line and are then gripped by said surfaces of wheels and moved upwardly from said second mentioned pair of members.

2. The structure set forth in claim 1 and a rotatable reel in front of said wheels disposed over said first mentioned pair of members and having oscillating rods adapted to move downwardly and rearwardly to move said vines rearwardly toward said wheels and members.

3. The structure set forth in claim 1, an endless belt-like conveyor having a flat surface disposed in the rear of said wheels and having its top run moving rearwardly and a second belt-like endless conveyor having a flat surface disposed to receive vines from said first mentioned conveyor and having its top run moving transversely of said machine to discharge at the side of said frame.

4. The structure set forth in claim 3 and an endless belt-like member having a flat surface disposed above said first mentioned conveyor and having its bottom run moving downwardly toward said first mentioned conveyor for moving said vines toward said first mentioned conveyor.

5. A machine for gathering and removing potato vines without lifting the potatoes having in combination, a wheel supported frame adapted to be moved along above the ground, a pair of vine-engaging members spaced substantially equal distances from the longitudinal center line of said frame and supported from said frame, said members having edges converging rearwardly and being spaced a small distance at their rear ends, said edges being in contact with the ground at their forward portions and extending upwardly toward their rear ends, a second pair of members having spaced plate-like portions adapted to move in engagement with the ground throughout the greater portion of their lengths, said latter members being spaced substantially equal distances from the said center line and curving upwardly above the ground at their forward ends, a pair of rotatable wheels disposed above said last mentioned members and having their central planes diverging upwardly, said planes also converging rearwardly, said wheels having side surfaces adjacent their peripheries which move in close proximity at their lower portions of said wheels whereby said vines will be engaged by said first mentioned members and will be moved toward said center line and will then be engaged by said second pair of members and moved farther toward said center line and between said surfaces of said wheels and will be moved upwardly by said wheels from said second mentioned pair of members.

6. The structure set forth in claim 5, said second mentioned pair of members each being pivoted about a horizontal axis at its forward end and being resiliently moved downwardly into engagement with the ground adjacent its rear end.

7. The structure set forth in claim 5, said wheels having pneumatic tires thereon, said side surfaces being on said tires.

EBEN D. DAHLMAN.

References Cited in the file of this patent

UNITED STATES PATENTS

| Number | Name | Date |
|---|---|---|
| 1,146,575 | Johnson | July 13, 1915 |
| 1,182,149 | Douglass | May 9, 1916 |
| 1,435,569 | Wilson | Nov. 14, 1922 |
| 1,462,948 | Thomas | July 24, 1923 |
| 2,314,773 | Dahlman | Mar. 23, 1943 |
| 2,413,072 | Sage | Dec. 24, 1946 |